INVENTOR
STANLEY H. ZEEB
ELMER R. STEINERT

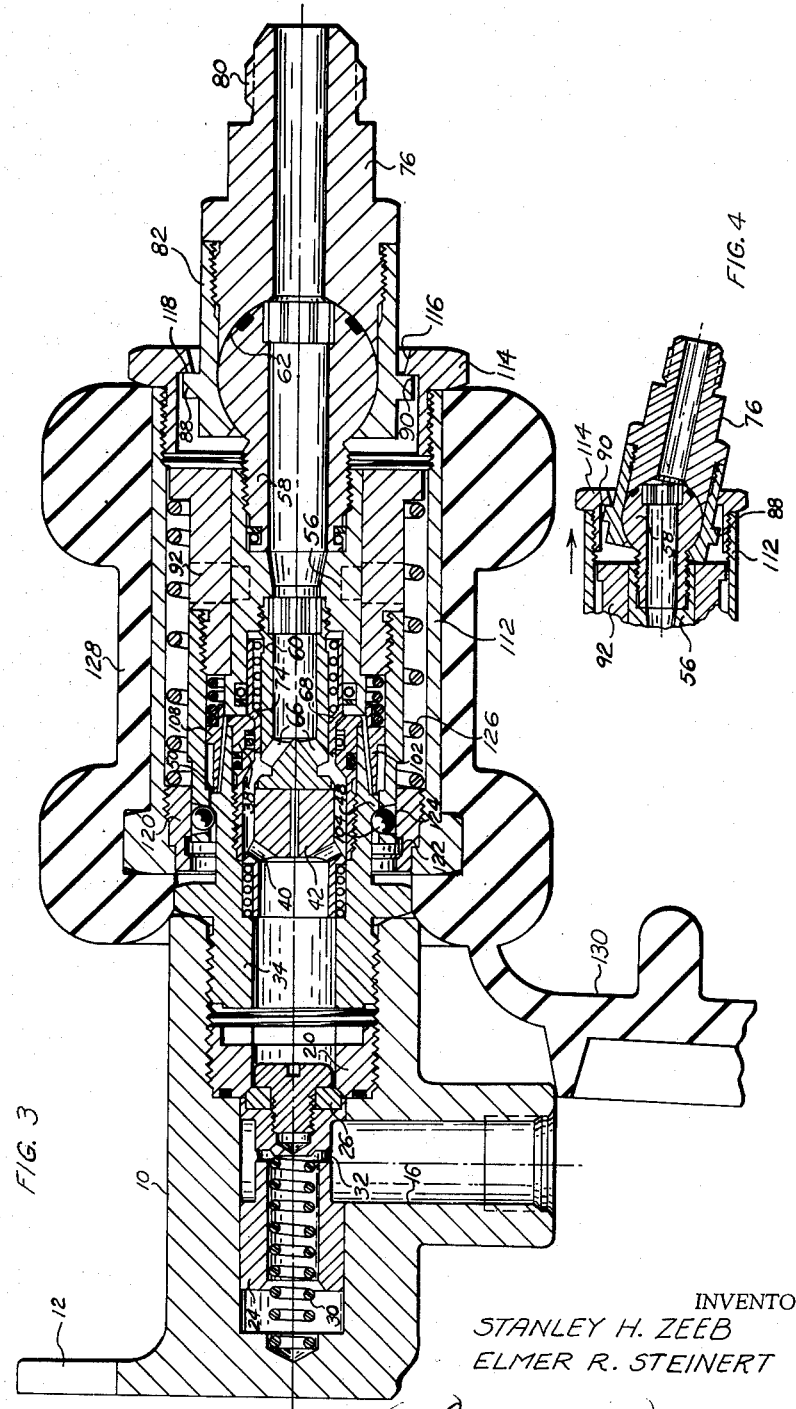

United States Patent Office 3,097,865
Patented July 16, 1963

3,097,865
QUICK RELEASE PIPE JOINT
Stanley H. Zeeb and Elmer R. Steinert, Jackson, Mich., assignors to Aeroquip Corporation, Jackson, Mich., a corporation of Michigan
Filed Apr. 8, 1959, Ser. No. 804,924
4 Claims. (Cl. 285—1)

The invention relates to a fluid coupling for use with conduits such as hose lines, pipes and the like and particularly pertains to a coupling of the self sealing type which will automatically separate upon transverse deflection of the attached conduit adjacent the coupling.

Self sealing fluid couplings which separate upon opposed, pre-determined, axial forces being applied to the coupling portions are known in the coupling art and find application in agriculture, automotive and other fields wherein it is desired to prevent damage to the conduit by axial stresses. Such couplings separate only under axial forces and hence a transverse pull on the conduit, usually in the form of a hose, will not cause the couplings to part and may rupture the hose. To overcome this shortcoming of conventional self releasing couplings it is proposed to provide a coupling construction which may be quickly affixed to a rigidly mounted support member and will automatically separate upon a given transverse deflection of the conduit adjacent the coupling. A coupling of the type proposed may be used wherever safety considerations require such a coupling operation, for example, as a fitting in a compressed air line used to start jet aircraft whereby motion of the aircraft before the air line is detached will automatically disengage the line from the aircraft fitting upon tensioning of the line.

It is thus an object of the invention to provide a fluid coupling which will automatically separate upon transverse deflection of the conduit adjacent the coupling yet may be manually disconnected by axial movement of a locking sleeve.

Another object of the invention is to provide a self sealing coupling which is capable of transmitting high fluid pressures and which the internal pressure does not materially affect the force required to uncouple the coupling components.

A further object of the invention is to provide a self sealing fluid coupling which will automatically uncouple upon a transverse force being applied to the conduit adapter of one of the coupling parts wherein such transverse force produces a positive uncoupling action.

Figure 1:
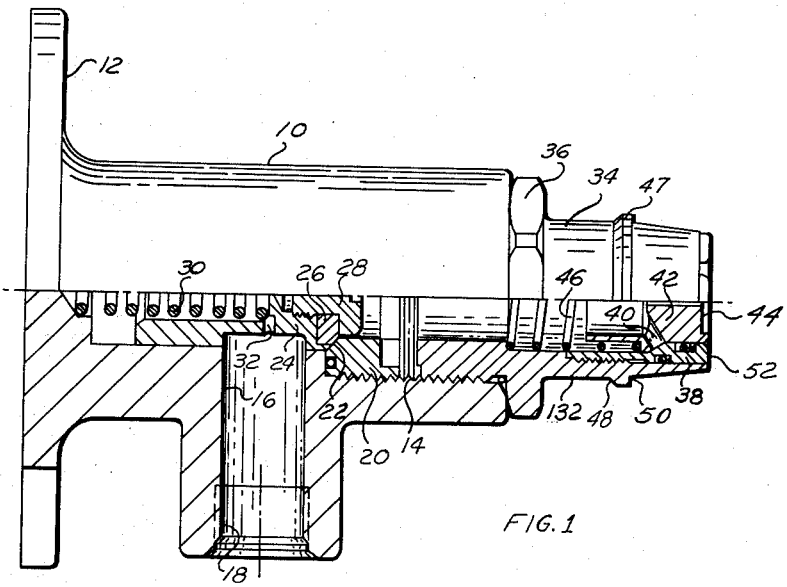
Figure 2:
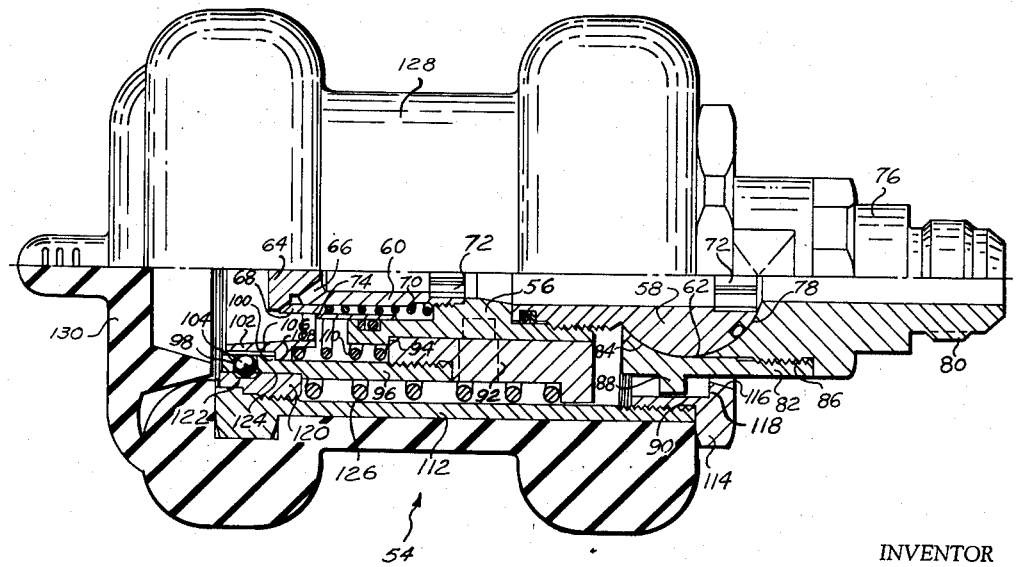

These and other objects of the invention arising from the structural details and relationships will become apparent from the following description and accompanying drawings wherein:

FIG. 1 is a partly sectioned elevational view of a mount assembly and the associated fixed coupling half which may be employed with the invention, FIG. 2 is a partly sectioned elevational view of the attachable coupling half showing the components in the normal "cocked" position, FIG. 3 is a sectional elevational view of the coupling halves in assembled locked relation, and FIG. 4 is a partial view of the coupling in the automatic release position wherein the hose adapter is axially deflected.

While it will be apparent that the coupling of the invention may be used in any of the conventional applications wherein self-sealing "breakaway" couplings are desirable, the described coupling is best employed in an application where one of the coupling halves are mounted on a relatively fixed or stationary object and the other coupling half is mounted on the end of a flexible hose. An important use of the described embodiment is with jet aircraft wherein the coupling is used in the compressed air line of portable compressors to supply air under high pressure to the starters of jet engines and as by way of example only the invention will be described as used in this manner.

The stationary or fixed coupling half may be supported in a mount 10 which is affixed to the aircraft within the wheel well by bolts extending through holes in the flange 12. Mount 10 is formed with an axial passage having stepped diameters and is threaded at 14. A passage 16 intersects the axial passage and is provided with threads 18 at the outer end whereby a conduit may be affixed to the mount in communication with the passages thereof. The conduit, not shown, which is affixed to threads 18 leads to the starter of the jet engine and establishes fluid connection between the mount and engine components requiring auxiliary air for starting purposes.

An annular valve retainer 20 having a conical seat 22 is affixed within the mount 10 by threads 14, as shown, and a cylindrical valve member 24 is slidable supported within the axial passageway. The valve 24 is provided with an annular sealing ring 26, held in place by a retainer 28, which coacts with the seat 22 to form a check valve within the axial passage. A compression spring 30 biases the ring 26 into engagement with seat 24 in the normal position and bleed off holes 32 are provided in valve 24 in communication with passage 16 to permit escape of air trapped behind the valve when the valve is opened.

The coupling body half 34 is of generally tubular configuration and is provided with exterior threads and a wrench engaging portion 36 which permits the coupling half to cooperate with threads 18 and facilitate a firm fluid tight connection with the mount 10 in communication with the axial passageway thereof. An annular valve retainer 38 is threadedly affixed within the open end of coupling 34 and has a conical seat surface defined thereon for sealing cooperation with ports 40 defined in an axially slidable valve 42 located within the bore of coupling 34. The outer face of valve 42 is provided with a cylindrical recess 44, for cooperation with the valve element of the other coupling half as will be explained, and a compression spring 46 forces the valve to a normal closed position wherein the ports 40 are sealed by the conical surface of retainer 38. A small air bleed passage may be provided in the head of valve 42 to equalize the air pressure on opposite sides of the valve.

As will be noted in FIG. 1, the exterior surface of coupling half 34 is formed with an integral annular ridge 47 having a conical surface 48 defined on the inner side thereof and a lateral face 50 formed on the outer side of the ridge. The coupling surface is in the form of a converging zone from the ridge to the coupling end as defined by end surface 52 of the valve retainer 38. This converging surface acts as a guide and facilitates assembly of the coupling halves. Sealing means of the O-ring type are employed between the coupling and mount components where structural design makes their use desirable to provide fluid tight connections.

The attachable coupling half 54 may take the form illustrated in FIG. 2 where the coupling is shown in the uncoupled or "cocked" condition ready to be attached to coupling half 34. Coupling 54 includes a generally cylindrical tubular body 56 having a stepped axial bore which is interiorly threaded at two locations whereby a swivel joint adapter 58 may be affixed to one end of the body and a tubular valve 60 may be affixed to the other end thereof. The swivel adapter 58 is axially bored and provided with a spherical outer surface 62 having a center of generation located on the axis of the body bore. The valve 60 is provided with an abutment face 64 and radial ports 66 which are adapted to be closed by an annular valve sleeve 68 slidably supported on the body 56. Sleeve 68 is normally biased to the left, FIG. 2, by a spring 70 to sealingly engage a conical surface on the valve 60 thereby preventing fluid flow through the ports 66. The valve and adapter are provided with internal wrench engaging portions 72 to facilitate assembly to the body and the sleeve 68 is formed with a stepped shoulder 74 for a purpose later described.

A hose fitting adapter 76 having a spherical recess 78 defined in one end for cooperation with surface 62 and a threaded portion 80 formed on the other end for connection to a hose fitting establishes fluid connection of the coupling 54 with the source of compressed air or other fluid transmitted through the coupling. An actuator sleeve 82 having an internal spherical annular surface 84 cooperable with the swivel adapter surface 62 and a threaded portion 86 engageable with threads formed on the hose adapter maintains the hose adapter swiveled, sealingly affixed to the surface 62 of the swivel adapter. A sealing ring is interposed between surfaces 62 and 78 to insure a fluid tight connection.

An annular cam ridge 88 projects from the actuator sleeve exterior surface to actuate the uncoupling action as will be later apparent. Ridge 88 is formed with planar transverse sides, one of which intersects with the periphery of the ridge to define an annular edge 90.

A tubular member 92 is slidably supported upon the body 56 and engages a shoulder 94 formed upon the body to limit movement to the left, FIG. 2, of the member 92 upon the body. Threads are formed upon a portion of member 92 whereby the annular ball sleeve 96 may be affixed thereto. Sleeve 96 is provided with a plurality of ball receiving conically shaped holes 98 which are circumferentially spaced about the sleeve in a common plane transverse to the axis of the coupling and an internal shoulder 100 is formed on the sleeve to limit movement of the ball retainer or retractor 102 as will be explained. A ball 104 is located within each hole 98 and the diameter of the ball is greater than the thickness of the wall dimension of sleeve 96 such that a portion of the ball will either extend into the interior of the sleeve or project beyond the outer periphery thereof. The dimensions of the conical holes 98 are such that the sides of the holes converge toward the axis of the coupling and the diameter of the inner edge of the holes is slightly less than that of the balls 104 whereby the balls will not pass through the holes when pushed inwardly.

The ball retainer 102 takes the form of an annular ring as shown in FIG. 2 having a generally tapered inner periphery and an outer periphery including a cylindrical portion 106 and a shoulder 108. The ball retainer is slidably supported within the bore of the ball sleeve 96 and is biased by a compression spring 110 to the left such that surface portion 106 retracts the balls 104 into the holes 98 and the shoulder 108 engages the shoulder 100.

A cylindrical lock sleeve 112 encompasses the aforementioned components of coupling half 54 and functions as the manual operating means for attaching and removing this coupling half to coupling part 34. A sleeve retainer 114 is threadedly affixed to the outer end of sleeve 112 and is formed with an axial opening 116 which provides clearance for the actuator sleeve 82. It will be observed that the opening 116 is substantially larger in diameter than the actuator sleeve as not to interfere with the swiveling action of the actuator sleeve and hose adapter 76 and a wrench engaging portion is formed on the retainer 114 to facilitate connection with the lock sleeve. An annular transverse surface 118 is provided in the bore of retainer 114 adjacent opening 116, surface 118 is engaged by cam ridge 88 when the coupling halves are coupled and provides means for operatively connecting the actuator and lock sleeves as explained hereinafter.

A ball race 120 is affixed within the other end of lock sleeve 112 by a thread connection and is provided with an internal cam groove 122 which receives balls 104 when the ball retainer 102 and race 120 are relatively positioned as in FIG. 2. The sides of groove 122 are inclined to diverge toward the coupling axis and a cylindrical surface portion 124 is defined on race 120 adjacent the cam groove. A compression spring 126 interposed between a shoulder formed on member 92 and race 120 biases these members in opposite axial directions which tends to misalign the cam groove 122 and balls 104, however, the ball retainer 102 prevents the balls from "riding up" out of the groove and the components will be maintained as in FIG. 2 in a "cocked" relation.

A rubber shock absorber 128 is affixed to the lock sleeve 112 and is provided with a pair of bulbous axially spaced portions of substantial thickness which will protect the coupling half 54 as it falls to the ground after being automatically disengaged from coupling half 34. Shock absorber 128 also serves as the hand grip portion of coupling half 54 and may be provided with a dust cap 130 which is hinged to the absorber by an integral flap and is used to close the end of the coupling when not in use.

The coupling halves are shown in coupled relation in FIG. 3 and the operation and function of the various components will become apparent from the following description of the coupling sequence. The coupling half 54 will appear as in FIG. 2 prior to coupling wherein the balls 104 are held within groove 122 by ball retainer 102 and the valve sleeve 68 closes off ports 66 to prevent flow of pressurized fluid through the coupling half. The dust cap 130 is first removed from its operative position and hinged to a non-interfering position as in FIG. 3. The coupling half 54 is then substantially axially aligned with the coupling half 34 and by gripping the shock absorber 128 the coupling half 54 is moved toward half 34 and the engagement of the bore of ball retainer 102 with the outer conical surface of coupling half 34 will facilitate alignment during the coupling action. Initially the valve face 64 will abut valve 42 and be received within the recess 44, continued movement of coupling 54 will move valve 42 to the left, FIG. 3, open the ports 40, compress spring 46 and the valve sleeve 68 will be sealingly received into the bore of the valve retainer 38.

As axial movement of the coupling 54 continues the outer end of ball retainer 102 will abut the face 50 of ridge 47 which will arrest further movement of the ball retainer and the balls 104 will then move along cylindrical portion 106. Shortly after the ball retainer engages face 50 the stepped shoulder 74 will contact the valve retainer 38 to prevent further movement of the valve sleeve 68 and hence the ports 66 will begin to be opened as the valve 60 continues to move to the left and the spring 70 is compressed. During the opening of ports 66 the balls 104 will be approaching ridge 47 and as the diameter of the ridge is sufficient to maintain the balls within cam groove 122 such relationship is maintained and the periphery of the ridge will function as a ball retainer immediately after the balls clear retainer surface 106.

As soon as the balls 104 pass over the periphery of ridge 47 the inwardly directed force exerted on the balls by the sides of cam groove 122 due to the spring 126 attempting to cause a relative axial displacement between ball sleeve 96 and ball race 120 will force the balls radially inward into engagement with the surface 132 of the coupling half 34 and the conical ridge surface 48 and the balls will now be backed by the cylindrical surface 124 of the ball race. At this position further movement of the coupling half 54 is prevented by engagement of the valve retainer end surface 52 with the end of body 56, FIG. 3, and the transverse surface 118 of the sleeve retainer will be in contact with the cam ridge 88.

The coupling sequence is now complete. The ports 40 and 66 are fully open and pressurized air may pass through the coupling which will open check valve 24 and permit the air to pass into passage 16 and into the engine starter. The described coupling is designed to operate at 3200 p.s.i. in this particular usage and the great pressure exerted on the coupling halves tending to uncouple them is effectively resisted by the balls 104 bearing against the conical surface of ridge 47 and the fact that the surface 124 of the race 120 prevents radial displacement of the balls. The force exerted by spring 126 is sufficient to prevent relative axial movement of race 120 and ball sleeve 96 due to vibration or gravity forces.

After the jet engine has started, the aircraft's compressor will produce a greater pressure within passage 16 than that within the coupling and thereby close the check 24. The operator then grasps the shock absorber 128 and pulls the lock sleeve 112 and ball race 120 toward the hose adapter 76. This force will compress spring 126 and align the cam groove 122 with the balls 104 which will now "ride up" surface 48 and be received into the groove and over ridge 47. As the coupling half 54 is further pulled to the right the ball retainer 102 will begin to overlap the balls maintaining them in groove 122, the valve sleeve 68 will begin to close ports 66 and the valve 42 will move toward the right, FIG. 3, in the opposite sequence to the coupling operation. Upon complete separation of the coupling halves the ports 40 and 66 will be completely closed and the halves self sealed.

It is also an important feature of the invention that the coupling half 54 will uncouple from half 34 should the aircraft begin to move before the mechanic has manually disengaged the coupling as described above. This is a necessary characteristic of couplings employed to start military aircraft due to the inability of the pilot to see if the coupling is connected or unconnected and the desire to take off as soon as possible. To accomplish this purpose is the function of the swivel joint adapter 58 and associated components. Assuming the coupling components to be in the position shown in FIG. 3 wherein the hose adapter 76 is coaxially aligned with the body 56, the cam ridge 88 and the edge 90 will contact the sleeve retainer surface 118 throughout 360° of the surface. Should the aircraft move before the coupling is disconnected the hose adapter 76 will be swiveled on the swivel adapter 58 upon the hose affixed to adapter 76 being pulled taut and this transverse force will tilt or swivel the adapter relative to body 56. As the hose adapter swivels, the portion of cam ridge edge 90 diametrically opposed to the direction of adapter deflection will function as a lever acting on surface 118 and "cam" the sleeve retainer 114, lock sleeve 12 and ball race 120 to the right as a unit and align the cam groove 122 with the balls 104. The balls will then be forced radially outward into groove 122 by surface 48 as the springs 46, 70 and 110 plus gravity will tend to separate coupling halves 34 and 54 and coupling 54 will fall to the ground. As it is often a distance of six or eight feet from the mount 10 to the ground the purpose of the shock absorber 128 will be obvious.

The above described camming action is positive in its operation and as cam ridge 88 and surface 118 are annular the lock sleeve will be moved to the right regardless of the direction of swivel movement of the hose adapter 76. From the construction described it will be appreciated that an axial pull on the hose adapter will not cause the coupling halves to automatically separate as an axial force is directly transmitted through body 56 through shoulder 94 to member 92 and hence to the ball sleeve 96. This construction prevents the high pressures within the coupling from accidentally causing uncoupling and to insure sufficient swivelling of the hose adapter to accomplish automatic disengagement. The mount 10 must be positioned such that the possible directions of hose tensioning will produce at least a 15° deflection of the hose adapter axis from the mount axis.

It will be understood that various embodiments of the invention may be apparent to those skilled in the art without departing from the scope of the invention, for instance, the locking members, balls 104, may take an arcuate wedge form to provide line or surface contact with surface 48, and it is intended that the invention be defined only by the following claims.

We claim:

1. In a fluid coupling comprising a pair of hollow body parts, locking means for maintaining said body parts in interlocking, coaxial communicatig relation, a conduit fitting, a universal swivel joint having a passageway therethrough affixing said fitting to one of said body parts and providing fluid communication therewith and means interconnecting said conduit fitting and locking means whereby pivotal deflection of the axis of said fitting a pre-determined extent from the axis of said joint will release said locking means.

2. The subject matter of claim 1 wherein said one of said body parts is substantially encased in a yieldable protective covering.

3. In a fluid coupling comprising first and second hollow body parts, locking means cammed by said body parts for maintaining said parts in interlocking, communicating relation, a universal swivel joint having a passageway therethrough affixed to said first body part and providing fluid communication therewith, a conduit fitting swivel mounted on said joint in communication therewith normally coaxial with respect to said first body part and means interconnecting the locking means carried by said first body part with the conduit fitting responsive to pivotal axial deflection of said fitting with regard to the axis of said joint whereby pre-determined deflection of said fitting will release the locking means of said first body part.

4. In a fluid coupling as in claim 3 wherein said swivel joint comprises a spherical surfaced adapter and said fitting is formed with a complementary spherical recess.

References Cited in the file of this patent

UNITED STATES PATENTS

| 377,075 | Jacob | Jan. 31, 1888 |
| 463,119 | Collins | Nov. 10, 1891 |
| 1,779,737 | Herlihy | Oct. 28, 1930 |
| 2,010,139 | Creveling | Aug. 6, 1935 |
| 2,377,812 | Scheiwer | June 5, 1945 |
| 2,428,637 | Scheiwer | Oct. 7, 1947 |
| 2,514,717 | Powey | July 11, 1950 |
| 2,854,259 | Clark | Sept. 30, 1958 |
| 2,896,977 | Hansen | July 28, 1959 |
| 3,039,794 | Cenzo | June 19, 1962 |

FOREIGN PATENTS

| 815,880 | Germany | Aug. 9, 1951 |